United States Patent [19]

Sides et al.

[11] Patent Number: 4,674,598
[45] Date of Patent: Jun. 23, 1987

[54] SINGLE POLE HUNTING STAND

[76] Inventors: Harold L. Sides, 7015 Blandford, Houston, Tex. 77055; Kurt M. Marshek, 9701 Courtleigh Cir., Austin, Tex. 78759

[21] Appl. No.: 861,281

[22] Filed: May 9, 1986

[51] Int. Cl.$^4$ ............................................. A01M 31/02
[52] U.S. Cl. .................................. 182/116; 182/129; 182/178; 182/189
[58] Field of Search ............... 182/116, 187, 115, 188, 182/178, 129, 189; 108/152

[56] References Cited

U.S. PATENT DOCUMENTS

| | | | |
|---|---|---|---|
| 3,057,431 | 10/1962 | George | 182/116 |
| 3,220,766 | 11/1965 | Kates | 182/116 |
| 3,967,694 | 7/1976 | Woolfolk | 182/108 |
| 4,274,508 | 6/1981 | Hughes | 182/116 |
| 4,428,459 | 1/1984 | Peck | 182/187 |
| 4,552,246 | 11/1985 | Thomas | 182/116 |

Primary Examiner—Reinaldo P. Machado

[57] ABSTRACT

The single pole hunting stand is supported on one leg and is stabilized using guy wires. The guy wires can be attached to stakes which are placed in the ground or attached to surrounding objects such as rocks, trees, or roots. The single pole configuration allows erection on any terrain with or without attaching to trees. The single pole hunting stand allows unobstructed 360 degree field of view and provides complete rotational freedom of movement with a swivel seat that is attached to the top of the pole. The swivel seat with back rest may be elevated to the desired height by changing the length of the pole.

The pole is equipped with steps which allows for easy and quiet access and egress to the swivel chair without having to adjust or move the stand. The single pole device does not attach directly to a single tree or require climbing a tree for access or egress, thus no environmental damage results. The single pole supports the hunter's weight without imposing the total hunter load on a tree.

The single pole may be collapsed or disassembled to create a shorter length; the swivel chair detached, and the guy wires coiled to allow compact packaging and shipment, assembly, easy movement and storage.

13 Claims, 2 Drawing Figures

U.S. Patent   Jun. 23, 1987   4,674,598

SINGLE POLE HUNTING STAND

BACKGROUND OF THE INVENTION

Hunting stands are devices which can be positioned to elevate the hunter above ground level in such a manner as to place the hunter above the line of sight of wild game. Hunting stands are generally positioned in wooded areas to provide cover to conceal the hunter. They are usually rigidly attached to a tree or have multiple legs for stability.

Most stands attach directly to a tree and must be adjusted to fit the tree selected. In cases where limbs prevent elevation to the desired height, a limb must be removed or the stand somehow must be moved above the limb before attachment. In many cases the tree is damaged by having a hunter climb upward while sliding the stand along below him. Access into tree type stands is generally achieved by using steps attached to the trunk of the tree or by climbing the tree. The stand can be positioned by sliding the stand up or down. Visibility and freedom of rotational movement in the tree type stand is restricted by the tree trunk and tree limbs.

The present invention is directed to an advanced device which utilizes a single pole. The single pole hunting stand is supported on one leg and is stabilized using guy wires. The guy wires can be attached to stakes which are placed in the ground or attached to surrounding objects such as rocks, trees, or roots. The single pole configuration allows erection on any terrain with or without attaching to trees. The single pole hunting stand allows unobstructed 360 degree field of view and provides complete rotational freedom of movement.

Experience has demonstrated a need for a stand which allows easy access and egress, 360 degree rotational freedom of movement, quietness in use, variable elevation, structural stability, back rest comfort, portability, and environmental compatible.

SUMMARY OF THE INVENTION

The principal objective of this invention is to eliminate the problems inherent in former hunting stands by providing a design which allows easy access and egress, 360 degree rotational freedom of movement, quietness in use, variable elevation, structural stability, back rest comfort, partability, and environmental compatibility.

The principal objective is accomplished by providing a hunting stand with a single pole stabilized with guy wires which are attached to stakes which are placed in the gound or attached to surrounding objects such as rocks, trees, or roots. Attachment to surrounding objects allows erection of the stand on any terrain with or without using trees.

A swivel seat, capable of quiet 360 degree rotational movement, is attached to the top of the pole. This arrangement provides total rotational movement without obstruction or noise. The swivel seat with back rest may be elevated to the desired height by changing the length of the pole, thus providing variable elevation for the hunter. The swivel seat has a contoured back rest which provides back comfort and spinal support.

The pole is equipped with steps which allows for easy and quiet access and egress to the swivel chair without having to adjust or move the stand. Since the single pole device does not attach directly to a single tree or require climbing a tree for access or egress, no environmental damage results. The single pole supports the hunter's weight without imposing the total hunter load on a tree.

The single pole may be collapsed or disassembled to create a shorter length; the swivel chair detached, and the guy wires coiled to allow compact packaging and shipment, assembly, easy movement and storage. The single pole provides a high strength to weight ratio structure and hence is a portable lightweight device.

DETAIL DESCRIPTION OF THE DRAWINGS

Figure 1:
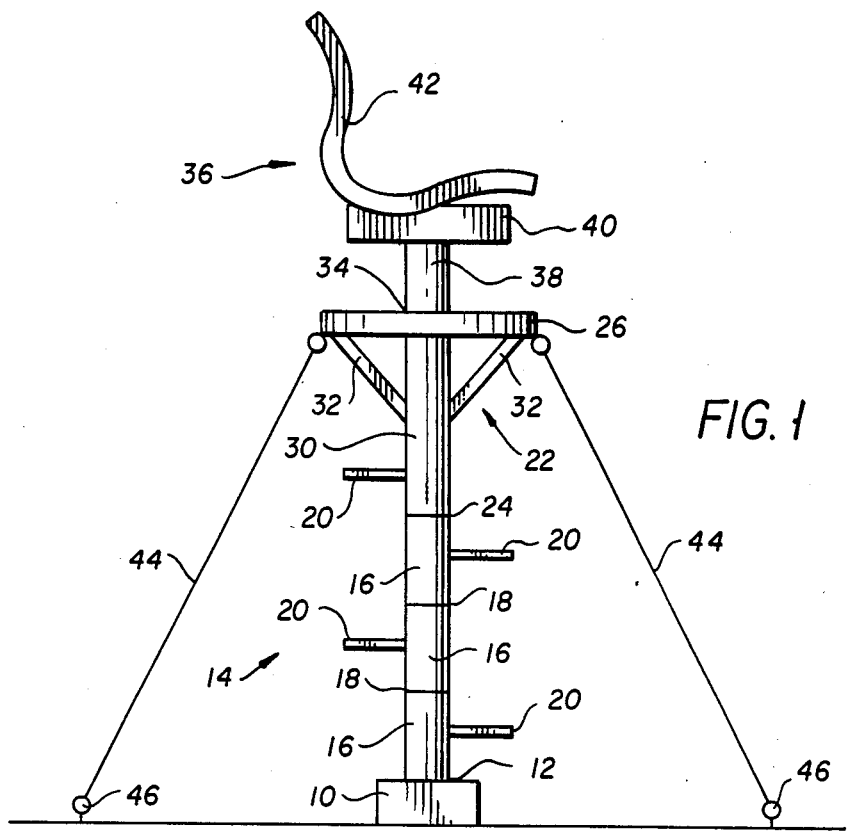
FIG. 1 is a side elevation view of the inventive single pole hunting stand and operative position.
Figure 2:
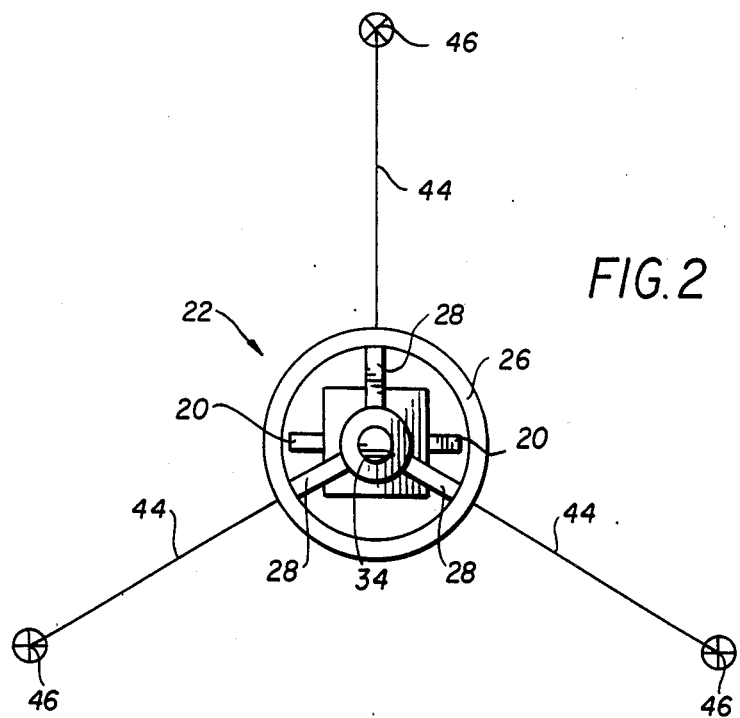
FIG. 2 is a top view of the inventive single pole hunting stand with the swivel chair assembly removed.

With reference to FIGS. 1 and 2, the configuration of the inventive hunting stand will be described. The hunting stand comprises a base 10 having a central joint 12 to receive a single pole 14. The single pole is made up of a series of separate members 16. These members are assembled into a single pole by means of joints 18. These joints can be a flared, pinned, screwed, flanged, or bolted connections. The particular shape and arrangement of the joint connections must be such that they join the separate members together so as to provide a continous single pole with sufficient structural integrity. The single pole has steps 20 which extend radially outward from each member.

A foot rest assembly 22 is fixed to the single pole 14 at joint 24. The foot rest assembly 22 includes the center pole 30 which is connected to the single pole 14 at joint 24; one step 20 which extends radially from the center pole 30; three uniformly spaced radial supports 28 connected to the center pole 30; three uniformly space diagonal supports 32 connected to the center pole 30; and one foot rest 26 connected to the three radial supports 28 and to the three diagonal supports 32.

Three guy wires 44 are attached to the foot rest 26 at or near the intersection of radial supports 28 and diagonal supports 32. The other end of each guy wire 44 is attached to objects 46 such as stakes, rocks, trees, or roots.

At the top of the foot rest assembly 22 is joint 34. The swivel chair assembly 36 is mounted to the foot rest assembly 22 at joint 34. The swivel chair assembly 36 includes the center support 38 which is joined at the bottom end at joint 34 and at the top end to a chair base 40, the chair base 40 which is attached to the center support 38; and the swivel chair 42, attached to the chair base 40.

Above, a specific embodiment of the present invention has been described. It should be appreciated, however that this embodiment was described for purposes of illustration only, without any intention of limiting the scope of the present invention. Rather, it is the intention that the present invention be limited not by the above but only as is defined by the appended claims.

What is claimed is:

1. A hunting stand the improvement comprising:
   a generally vertical single pole or the like being so constructed and arranged to generally support the entire weight of the hunter or the like and being provided with a base on one end adapted to rest on the ground, steps attached to, or in, the single pole, a foot rest assembly fixed to the other end of the single pole adapted to accept a chair assembly, three or more guy wires or the like attached to the foot rest assembly to stabilize the single pole.

2. A hunting stand according to claim 1 in which the base has a cross sectional area greater than the cross sectional area of the single pole for preventing movement of the base.

3. A hunting stand according to claim 1 in which the single pole is made up of a series of separate members joined together to allow variation in pole height.

4. A hunting stand according to claim 3 in which each member has steps extending radially outward.

5. A hunting stand according to claim 1 in which the foot rest assembly includes a center pole which is connected to the single pole, one step which extends radially from the center pole, three or more uniformly spaced radial supports connected to the center pole, three or more uniformly spaced diagonal supports connected to the center pole, and one foot rest connected to the radial supports and to the diagonal supports.

6. A hunting stand according to claim 1 in which the chair assembly includes a swivel means for chair rotation.

7. A hunting stand according to claim 1 in which the chair assembly is mounted to the foot rest assembly and includes a center support which is joined at the bottom end to the foot rest assembly center pole and at the top end to a chair base attached to a chair.

8. A hunting stand according to claim 3 in which the size of the members is such as to allow ease of shipment, assembly, transport, and storage.

9. A hunting stand according to claim 1 in which the chair assembly provides a chair with a backrest.

10. A hunting stand according to claim 1 in which the three or more guy wires of the like attached to the foot rest are attached at the other end to surrounding stationary objects such as stakes, rocks, trees, or roots.

11. A hunting stand according to claim 1 in which the generally vertical single pole or the like is a tube, pipe, column, channel, or ladder.

12. A hunting stand according to claim 1 in which the three or more guy wires or the like are attached to the single pole or to the chair assembly to stabilize the single pole.

13. A hunting stand according to claim 1 in which the three or more guy wires or the like are cables, chains, ropes or other members.

* * * * *